United States Patent [19]
Ellsworth et al.

[11] Patent Number: 5,737,240
[45] Date of Patent: Apr. 7, 1998

[54] PROGRAMMABLE HARDWARE MAILBOX MESSAGE TECHNIQUE AND SYSTEM

[75] Inventors: Earle Ellsworth, Benson; Laura Hepner Evans, Tucson; Sangram Singh Ghoman, Tucson; Enrique Quique Garcia, Tucson; Thomas Charles Jarvis, Tucson; Matthew Joseph Kalos, Tucson; Ralph O'Neill, Tucson, all of Ariz.; Lisa Phan, Austin, Tex.; David Brent Schreiber, Tucson, Ariz.

[73] Assignee: International Business Machines Corporation, Armonk, N.Y.

[21] Appl. No.: 591,062

[22] Filed: Jan. 25, 1996

[51] Int. Cl.⁶ ............................................. G06F 17/00
[52] U.S. Cl. .................... 364/514 R; 395/200.04; 395/200.09; 395/835; 395/837
[58] Field of Search ............... 395/200.04, 200.08, 395/200.09, 835, 837; 364/514 R

[56] References Cited

U.S. PATENT DOCUMENTS

| | | | |
|---|---|---|---|
| 4,630,041 | 12/1986 | Casamatta et al. | 340/825.5 |
| 4,761,732 | 8/1988 | Eldumiati et al. | 364/200 |
| 4,779,194 | 10/1988 | Jennings et al. | 364/200 |
| 4,821,178 | 4/1989 | Levin et al. | 364/200 |
| 5,148,544 | 9/1992 | Cutler et al. | 395/725 |
| 5,179,704 | 1/1993 | Jibbe et al. | 395/725 |
| 5,325,310 | 6/1994 | Johnson et al. | 364/514 |
| 5,410,715 | 4/1995 | Ishimoto et al. | 395/775 |
| 5,471,618 | 11/1995 | Isfeld | 395/839 |
| 5,555,191 | 9/1996 | Hripcsak | 364/514 R |
| 5,555,413 | 9/1996 | Lohman et al. | 395/733 |
| 5,615,375 | 3/1997 | Ibusuki et al. | 395/737 |
| 5,628,017 | 5/1997 | Kimmerly et al. | 395/704 |

*Primary Examiner*—Emanuel T. Voeltz
*Assistant Examiner*—Kaminis Shah
*Attorney, Agent, or Firm*—R. M. Sullivan

[57] ABSTRACT

A mailbox message system is coupled between a processor having a mailbox and one or more peripheral devices or circuits communicating information to the processor. The mailbox message system in the present invention reports events which occur in the peripheral devices or circuits to the mailbox within the processor to be serviced by the processor. The mailbox message system receives inputs from the processor indicating which events are allowed to be currently serviced by the processor and stores these inputs in a first memory. The mailbox message system further receives unique signals representing distinct events from the peripheral devices and stores these signals in a second memory. The generated events which are pending service in the second memory are then compared with the allowed events in the first memory. When a match exists, a message is encoded and transmitted to the mailbox of the processor indicating that the processor has an event to be serviced. The processor then must service all the pending events in the second memory.

13 Claims, 2 Drawing Sheets

PROGRAMMABLE HARDWARE MAILBOX MESSAGE TECHNIQUE AND SYSTEM

FIELD OF THE INVENTION

The present invention relates generally to data processing systems, and more particularly, to mailbox message techniques within a data processing system. Data processing systems typically comprise a central processing unit, or processor, coupled to one or more memories and one or more peripheral circuits or devices. The processor contains a dedicated memory, denoted as a mailbox, for receiving messages. The messages correspond to specific events which occur within the peripheral circuits or devices. These events require action to be taken by the processor. The present invention relates to a method and apparatus for reporting to the mailbox within the processor an event occurring within the peripheral units which needs to be serviced by the processor.

BACKGROUND OF THE INVENTION

Data processing systems typically contain a central processing unit, or processor, to manage the movement of information, or data, between different peripheral units, or devices, coupled to the processor. To manage the movement of data, data processing systems typically accept requests for data from user-controlled input devices, access data from data storage devices, modify data within a central processing unit, and store data back to data storage devices. Data processing systems can vary in size and scope, from small systems totally contained within the one or more circuit boards to large systems transferring large blocks of data between numerous devices separated by great distances. In turn, the central processing unit can vary in size and scope from small microprocessors to large host processing units.

The central processing unit, or processor, within the data processing system typically serves as the central, controlling means for managing the system. The processor controls the surrounding components, circuits, memories, and/or devices. The processor receives signals and information from the peripherals, makes decisions based on this information, and takes actions based on these decisions. In some instances, the actions taken by the processor involve providing feedback signals and/or responses to the peripheral circuitry.

The central processing unit, or processor, runs control instructions which guide its decision-making capabilities. The control instructions are ordered in a sequence called a control program. The control program resides in a memory dedicated to the processor, denoted a control storage, within the data processing system. The control program performs arithmetic and logic operations, monitors the status of certain conditions within the system, controls the transfer of data and information between components of the system, receives events generated within the peripheral circuits and devices in the system, and responds to such events.

In some instances, the processor may need to immediately service or respond to an event occurring within the peripheral units. Thus, the processor needs to detect when the event has occurred. The processor can accomplish this in various ways. First, the processor could continuously monitor a data element within a memory serving as a status flag for the event. Often, a bit within a register is used to indicate whether the event has occurred or not. A control instruction commands the processor to read the register, to transfer the contents of the external register to an internal register within the processor. This transfer occurs through one of the processor's ports. A second control instruction commands the processor to test the status of the individual bit representing the desired event. If the bit indicates that the event occurred, the control program can then execute a sequence of instructions which serve as the designed response to the event. If the bit does not indicate that the event occurred, the control program continues with its normal sequence of operation.

Requiring the processor to continuously monitor a status flag is an inefficient method for determining whether an event has occurred within the peripheral units. The processor must periodically check the status of the flag to record that the event has occurred. That is, the processor must periodically perform the following routine: it must read the register, test the flag representing the event, and branch within the control program based on the status of the flag. To effectively monitor the flag, the processor must perform this read, test, and branch routine in a timely interval. That is, the processor cannot allow too much time to elapse between its testing of the flag. Otherwise, the processor may miss the occurrence of the event. The event may occur, setting the flag, and then disappear, resetting the flag, without the processor "seeing" the flag set. If the processor were to miss "seeing" the occurrence of the event, the setting of the flag, the portion of its control program designed to respond to the event would not be executed.

Further, the processor has less resources, processor cycles, to accomplish its other tasks when it must periodically check a status flag in a register. As stated earlier, the control program running in the processor is designed to perform many tasks. When the frequency of status flag checks increases for the processor, the portion of the control program performing the status flag checks must execute more often. This affects other portions of the control program; they either run less often or not at all.

The above described disadvantages of monitoring a status flag as a means for the processor determining when a specific event has occurred are multiplied when the processor must acknowledge multiple events. The processor then must read a certain register, test a specific bit, and branch on the status of the specific bit for each event it must monitor. Each of these monitoring routines must be repeated for each event the processor services. With the addition of each event and the associated monitoring routine, the processor has less time and processor cycles to dedicate to the other tasks operating in the control program.

As an alternative to having the processor periodically monitor a status flag in a register, the occurrence of an event can trigger an interrupt to the processor. A processor typically has specific ports dedicated to interrupts from external sources. When the processor receives a signal on one of these interrupt ports, it attempts to interrupt the portion of the control program currently executing. Generally, interrupts are prioritized in a specific order based on the importance or urgency of the task associated with each interrupt. High priority interrupts require the control program to suspend the portion currently running to service the event associated with the incoming interrupt. Alternatively, low priority interrupts will not suspend the task associated with the currently executing portion of the control program.

If an event associated with a high priority interrupt occurs, the control program must be suspended. In this instance, a set of parameters indicating the state of the task currently executing in the control program is saved away in a dedicated portion of the processor's control storage. Control is then transferred to the portion of the control program designed to service the event associated with the interrupt signal. The processor then executes the routine for handling and possibly responding to the event which generated the interrupt. Once the processor has serviced the event, and the corresponding interrupt, the state of the task that was executing in the control program prior to the high priority interrupt is restored by fetching the parameters previously saved in the dedicated portion of the processor's control storage. The control program then resumes execution with the suspended task.

If an event occurs in the peripheral devices or circuitry which corresponds to a lower priority interrupt than the task currently running in the control program, the interrupt generated by the event does not suspend the current task in the control program. Instead, the interrupt is queued in an interrupt interface unit. When the current task is completed, the control program immediately searches for a new task to process. Other tasks may be scheduled to operate within the control program. In addition, the control program may search the queued interrupts to determine whether any of these have a higher priority than the scheduled tasks. If a queued interrupt has the next priority, a set of parameters indicating the current state of the control program is saved in a dedicated portion of the processor's control store. The processor then services the interrupt by branching control to the routine in the control program designed to handle the event associated with the interrupt. After the interrupt is serviced, and the event is responded to, by the processor, the state of the control program is restored using the parameters previously saved in dedicated portion of the processor's control store.

Thus, interrupts provide the processor with the ability to immediately service an event generated in the peripheral units of a data processing system once the event's priority establishes that event as the most important task to be handled by the processor's control program. However, this advantage is offset by one significant disadvantage. Using interrupts to report to the processor certain events occurring in the peripheral circuitry requires a large overhead in the processor. That is, numerous control instructions and processor cycles are required to save the state of the control program before suspending its execution to service a single interrupt. In addition, additional control instructions and processor cycles are needed to restore the state of the control program to resume the control program when the interrupt routine has completed servicing the single interrupt.

To compound the overhead problem, a processor in a data processing system must typically service multiple events in multiple peripheral circuits and devices through multiple interrupts. Also, each event which causes an interrupt can occur numerous times. Together, the overhead measured in control instructions and processor cycles totals a significant amount of the performance of the processor. This larger overhead substantially reduces the capability of the control program to handle its other tasks. This problem with overhead may make interrupts an inefficient and impractical method for the processor to service events which occur frequently within the peripheral circuitry and devices.

A third alternative method for reporting events to a processor is to use a mailbox within the processor. Typically, a mailbox is a memory attached to the processor and dedicated to receiving and queuing messages sent to the processor. This method is usually used when one processor needs to communicate to another processor. One task running in the control program of the first processor needs to communicate information to the second processor and may also need to wait for a response from the second processor. In this instance, the control program executing in the second processor includes a routine for inspecting the contents of the mailbox, typically denoted a message handler. The control program in the second processor is not suspended to conduct this inspection. Instead, the task associated with searching the processor's mailbox, the message handler, is periodically scheduled to execute within the control program.

Once the message handler in the second processor discovers a message within the mailbox, control is transferred to the portion of the control program designed to service the specific message, and the event associated with the message. Typically, each unique event corresponds to a unique message. The mailbox typically stores the messages in the sequence in which they were received, similar to a first in, first out (FIFO) queue. Some message handlers may service the messages, and the events corresponding to the message, in the order in which the messages reside in the mailbox. However, the message handler need not address the messages in that particular sequence. More sophisticated message handlers may use different rules to base the priority in which messages are serviced.

Once the message handler decides which message to process, it invokes the portion of the control program designed to respond to the event which generated the message. This routine in the control program takes actions necessary to respond to the event which brought about the message. As one of these actions, the second processor may need to send a message to the first processor. In this respect, the first processor also contains a message handler within its control program which is periodically scheduled to inspect the mailbox in the first processor for incoming messages. When all the required actions are taken in the second processor to service the message originating in the first processor, control is returned to the message handler within the control program of the second processor. The message handler may either service an additional message queued in the mailbox or return control to the task dispatcher, the portion of the control program which maintains the scheduling of tasks within the control program and dispatches these tasks at their appointed time.

A mailbox can also be used to handle events generated from the peripheral units coupled to the processor. In this instance, the occurrence of the event triggers a message which is transmitted to the mailbox of the processor. The control program within the processor handles the message in the mailbox in the same manner as it handles a message sent from a second processor. Typically, each type of event generates an unique message code. In addition, each occurrence of an event generates a separate message to be transmitted to the processor's mailbox. Thus, repeat occurrences of the same event type generate multiple messages in the processor's mailbox.

As stated previously, the mailbox is a memory coupled to the processor and dedicated to storing messages. Because it is a memory, the mailbox is of limited size and can store only a limited number of messages. Accordingly, the message handler is designed to handle a limited number of messages, corresponding to the memory size of the mailbox. Thus, a method for transmitting messages to the processor's mailbox is needed such that all events occurring in the peripheral units are reported to the processor without overflowing the mailbox.

SUMMARY OF THE INVENTION

An object of the present invention is to provide an improved method and apparatus for reporting events generated by peripheral units to a control program running within a processor.

Another object of the present invention is to provide a method and apparatus for reporting to the processor all events generated by the peripheral units such that the control program running within the processor can service the reported events without overflowing its resource constraints.

An embodiment of the present invention provides a method for reporting events to a control program running within a processor by transmitting a message to a mailbox coupled to the processor and dedicated to receiving and storing the messages for the processor.

A mailbox message system for carrying out the method couples a processor running a control program to one or more peripheral units generating events to be serviced by the processor. A mailbox for receiving and storing messages is coupled between the mailbox message system and the processor. The mailbox message system includes a pending buffer, an event signal buffer, an allow buffer, a comparator, and an encoder.

The method latches event signals in the pending buffer and the event signal buffer corresponding to events generated by the peripheral units. The method also sets allowable events in the allow buffer corresponding to which events are currently eligible for service by the control program. The method subsequently compares the event signals with the allowable events in the comparator to determine whether any event qualifies for service by the control program. When an event qualifies for service, the encoder builds a message and transmits the message to the mailbox.

The foregoing and other objects, features, and advantages of the invention will be apparent from the following more particular description of a preferred embodiment of the invention, as illustrated in the accompanying drawings.

DETAILED DESCRIPTION OF THE INVENTION

A data processing system typically comprises a central processing unit, or processor, and any number of peripheral units. The peripheral unit may be a separate system component such as a memory or a data storage device. Examples of such memories are cache for storing frequently accessed data or control storage for storing control instructions. Data storage devices can be magnetic disk drives, magnetic tape drives, optical disk drives, or optical tape drives. Alternatively, the peripheral unit may simply be circuitry, or logic, designed to communicate with the processor using control signals. As such, the processor typically serves as the control center of the data processing system. The peripheral units typically must communicate with the processor to provide the processor with information necessary for the processor to make accurate decisions involving the data processing system. Events typically occur within each peripheral unit that cause the peripheral unit to signal the processor. Many times, the processor must be quickly notified of the occurrence of the event in the peripheral unit to effectively perform its decision-making tasks for the data processing system.

As described earlier, several methods currently exist to allow the peripheral units to communicate these events to the processor. The peripheral unit can set a flag in a status register which is periodically monitored by the processor. Alternatively, the peripheral unit can send an interrupt to the processor when the event occurs thereby suspending the operation of the control program in the processor. Finally, the peripheral unit can send a message to a dedicated memory, or mailbox, coupled to the processor. In this method, the processor can detect the event and respond to the event without suspending its control program. The processor need only periodically check one dedicated memory, the mailbox, to discover reported events instead of having to check many different flags in different registers. Thus, this mailbox message method of reporting events to the processor from peripheral units within a data processing system has advantages over the other two commonly used methods.

Figure 1:
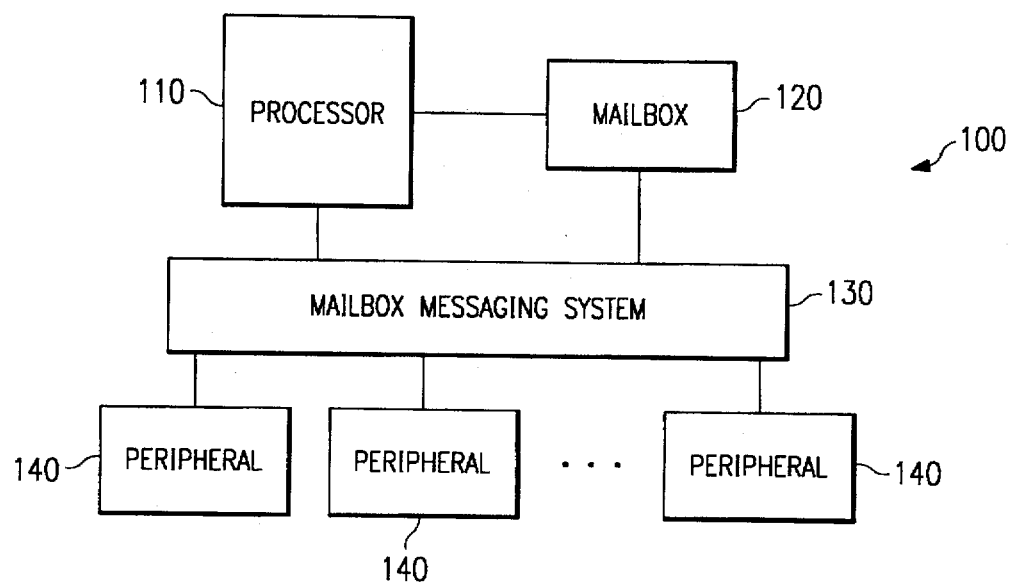
FIG. 1 is a block diagram of a data processing system having mailbox message capabilities.
Figure 2:
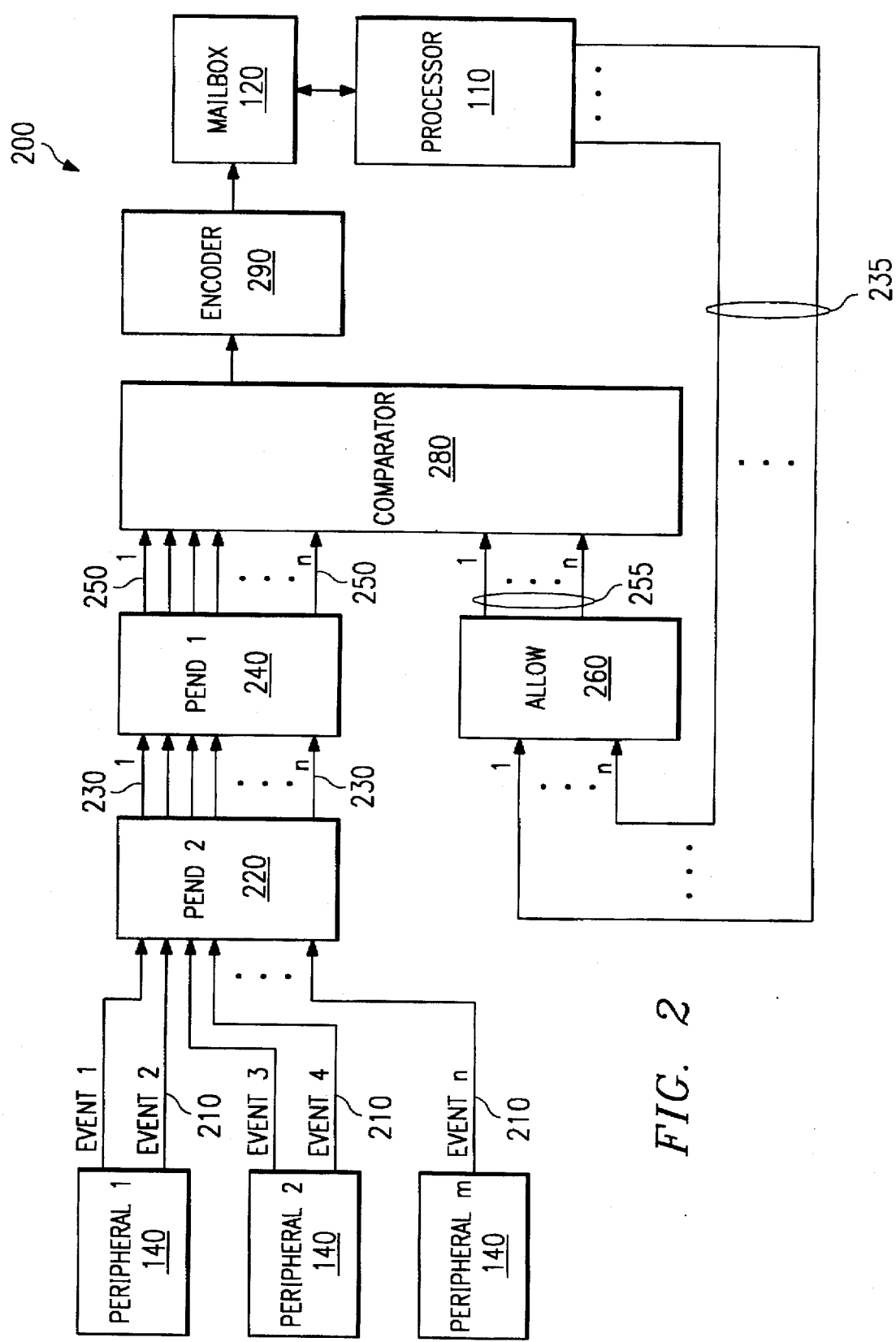
FIG. 2 is a block diagram of a data processing system showing the mailbox message system of the present invention in greater detail.

Referring now to FIG. 1, this figure depicts a high level view of a data processing system 100 which utilizes a mailbox message system. A processor 110 is the computing and decision-making center of the data processing system 100. The processor 110 runs control instructions comprising a control program. The control program is stored in a memory dedicated to the processor, or control storage. The processor is coupled to an additional memory, a mailbox 120. The mailbox 120 stores messages which represent events to be reported to, and eventually serviced by, the processor 110. Peripheral units 140 exist within the data processing system 100 to perform a variety of tasks. The peripheral units 140 report certain key events to the processor 110 to assist the processor 110 in its computing and decision making. A mailbox message system 130 is coupled between the peripheral units 140 and the processor 110 and its mailbox 120. The mailbox message system 130 receives event signals from the peripheral units 140 indicating the occurrence of certain events and transmits a message to the mailbox 120 when one of the occurring events is serviceable by the processor 110. FIG. 2 provides a more detailed block diagram of the mailbox message system 130 of the present invention. A data processing system 200 which utilizes the mailbox message system 130 of the present invention is also shown. Peripheral units 140 generate events which must be reported to and ultimately serviced by the processor 110 within the data processing system 200. The events are outputs 210 of the peripheral units 140. Signal lines 210 couple these event outputs with inputs to a pending buffer 220. Events 210 are latched as event signals within the pending buffer 220, each unique event represented by a unique event signal 210. Thus, the pending buffer 220 contains N data elements to latch N different events 210 from the peripheral units 140.

The pending buffer 220 is coupled to an event signal buffer 240. Signal lines 230 connect the N outputs of the pending buffer to N inputs of the event signal buffer 240. As with the pending buffer 220, the event signal buffer 240 contains a separate data element for each unique event generated in the peripheral units 140. Thus, the status of whether a particular event has occurred within the peripheral units 140 is reflected in the data elements within the pending buffer 220 and the event signal buffer 240. Signal lines 250 connect the outputs of the event signal buffer 240 to a portion of the inputs of a comparator 280. The comparator 280 is a circuit which compares pairs of input lines to determine when a particular event signal 250 is qualified to be serviced by the processor 110.

An allow buffer 260 exists to assist in determining when an event signal 250 is qualified for servicing by the processor 110. Signal lines 235 couple the allow buffer 260 to the processor 110. The allow buffer 260 contains N inputs and N data elements, one input and one data element for each unique event 210 that can be generated in the peripheral units 140. The control program running within the processor 110 sets or resets the data elements within the allow buffer 260 by using the corresponding signal lines 235 connected to the inputs of the allow buffer 260. The control program sets a particular data element when the control program determines that the event corresponding to that data element is eligible for servicing by the processor 110. Additional signal lines 255 couple the outputs of the allow buffer 260 to a second pair of inputs in the comparator 280.

As stated earlier, the comparator 280 is a circuit which compares pairs of input signals. In the mailbox message system 130 of the present invention, the comparator 280 compares N pairs of signals, corresponding to N distinct events 210 to be serviced, to determine which of the N distinct events are qualified for servicing by the processor 110. One signal of the pair represents whether a particular event 210 has occurred in a peripheral unit 140. If the particular event 210 has occurred, the corresponding data element in the event signal buffer 240 will be set. The status of each data element within the event signal buffer 240 is transmitted to the comparator 280 along the connecting signal lines 250. The other signal of the pair represents whether the processor 110 currently allows the same event 210 to be serviced. If the particular event 210 is eligible for servicing by the processor 110, the control program running within the processor 110 sets the data element within the allow buffer 260 corresponding to the particular event 210. The status of each data element within the allow buffer 260 is transmitted to the comparator along the connecting signal lines 255.

The comparator 280 qualifies events 210 for servicing by the control program running within the processor 110. To qualify for servicing, the data element in the event signal buffer 240 and the data element in the allow buffer 260 corresponding to the same event 210 must be set at the same time. The comparator 280 is further coupled to an encoder 290. When the comparator 280 detects that both data elements are set for the same event 210, it notifies the encoder 290 that a message should be built to indicate that an event is qualified for service. The encoder 290 is coupled to the mailbox 120 of the processor 110. The encoder 290 transmits the message to the mailbox 120. The mailbox 120 is a memory coupled to the processor 110 for storing messages delivered to the processor 110. The mailbox 120 can store a finite number of messages within the memory. The processor 110 accepts these messages from the mailbox in a prescribed order. Typically, the processor 110 services messages in the order in which they were received at the mailbox 120, such as is done in a first in, first out (FIFO) queue.

During normal operation, the processor 110 selects which events 210 are allowable events for servicing by setting and resetting the data elements within the allow buffer 260. Events 210 which occur within the peripherals 140 are latched as event signals into the pending buffer 220. These event signals are then transferred to the event signal buffer 240. The comparator 280 then compares the event signals 250 with the allowable events 255 to determine if any events qualify for servicing by the control program running in the processor 110. If any event qualifies for servicing, the comparator 280 signals the encoder 290 that a message should be built. The encoder 290 constructs a message denoting that an event 210 generated in the peripheral units 140 has qualified for servicing by the control program. The encoder 290 then transmits this message to the mailbox 120 where the message is stored until the processor 110 requests to receive it. When the processor receives the message from the mailbox 120, the control program analyzes each event signal latched in the event signal buffer 240 to determine if the corresponding event 210 requires servicing.

During the time between when the encoder 290 transmits the message to the mailbox 120 and when the control program completes analyzing the event signals latched in the event signal buffer 240, subsequent events 210 likely will occur within the peripheral units 140. This time period will be referred to as the pending period. Subsequent events 210 occurring in the pending period are latched in the pending buffer 220. However, the event signals corresponding to these subsequent events 210 may not be immediately transferred to the event signal buffer 240 depending on whether the mailbox message circuit 200 is in a manual or automatic mode of operation.

If the mailbox message circuit 200 is in automatic mode of operation, subsequent event signals in the pending buffer 220 are not transferred to the event signal buffer 240 during the entire pending time period. These subsequent event signals are held in the pending buffer 220 until the control program running in the processor 110 has completed servicing all qualified event signals latched in the event signal buffer 240. Once the control program has completed servicing the event signals, the contents of the pending buffer 220 are copied to the event signal buffer 240. Subsequent events 210 occurring after the pending period has elapsed are latched in the pending buffer 220 and immediately transferred to the event signal buffer 240 until an event is qualified by the comparator 280. At this time, a new pending period starts and the encoder 290 builds a new message and transmits it to the mailbox 120.

Alternatively, if the mailbox message circuit 200 is in manual mode of operation, subsequent event signals latched in the pending buffer 220 are still transferred to the event signal buffer 240 for a portion of the pending period. The pending buffer 220 transfers subsequent event signals to the event signal buffer 240 so long as the control program in the processor 110 is not analyzing the contents of the event signal buffer 240 to determine which events 210 to service. That is, subsequent event signals are held in the pending buffer 220 once the processor 110 fetches the message from the mailbox 120. Otherwise, subsequent event signals are immediately copied to the event signal buffer 240 if they are received in the pending buffer 220 after the encoder 290 transmits a message to the mailbox 120 but before the processor 110 receives the message. Once the control program has completed servicing the event signals in the event signal buffer 240, the contents of the pending buffer 220 are copied to the event signal buffer 240.

Figure 3:
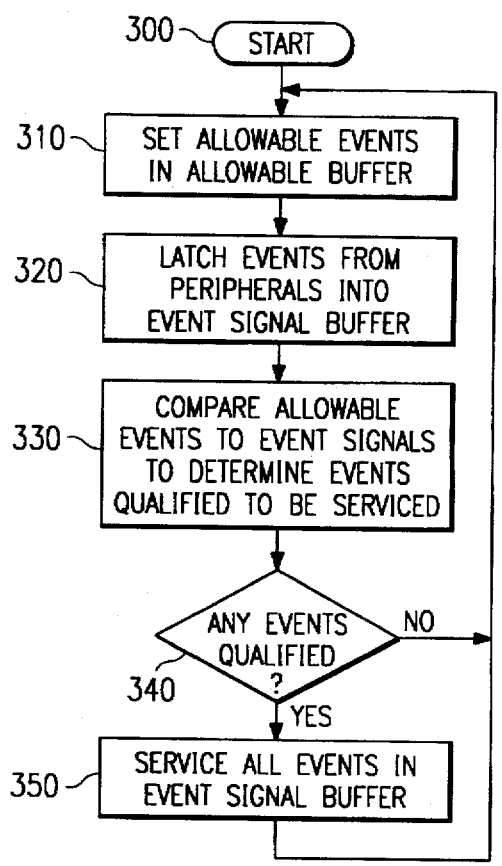
FIG. 3 is a flow diagram of a method in the present invention for reporting events generated in peripheral devices to the processor within the data processing system of FIG. 1.

Referring to FIG. 3, a flow diagram is shown describing the method by which events generated in the peripheral units 140 are serviced by the processor 110. A step 300 indicates the start of the method. At step 310, the processor 110 sets the data elements in the allow buffer 260 to indicate which events 210 are allowable events eligible for service by the control program running in the processor 110. As described earlier, each data element in the allow buffer 260 corresponds to an unique event 210 within the peripheral units 140. By setting a data element, the control program indicates that the processor 110 can service the event 210 corresponding to the data element should the event 210 occur within the peripheral units 140. Likewise, when it resets a data element in the allow buffer 260, the control program indicates that the processor 110 is not ready to service the event 210 corresponding to the particular data element should the event 210 occur within the peripheral units 140.

At Step 320, events 210 occurring within the peripheral units 140 are latched as event signals and stored in the data elements within the event signal buffer 240. At step 330, the allowable events within the allow buffer 260 are compared with the event signals within the event signal buffer 240 to determine if any events 210 qualify for servicing by the control program running in the processor 110. An event 210 qualifies for service by the processor 110 if the data element in the allow buffer 260 and the data element in the event signal buffer 240 corresponding to the event 210 are both set. Step 340 determines whether any events 210 have been qualified for service by the processor 110 in step 330. If any event 210 qualifies for service by the processor, step 350 provides that the processor 110 service the qualified event and all other events 210 latched in the event signal buffer 240. The control program within the processor 110 must analyze each event 210 latched in the event signal buffer and service those event signals that correspond to allowable events.

Once the processor 110 has completed servicing all qualified events, steps 310, 320, and 330 are repeated to determine if any subsequent events 210 qualify for service by the processor 110. Likewise, if no events qualified for service in step 340, step 350 is bypassed and steps 310, 320, and 330 are repeated to determine if subsequent events 210 occurring within the peripheral units 140 qualify for service.

Figure 4:
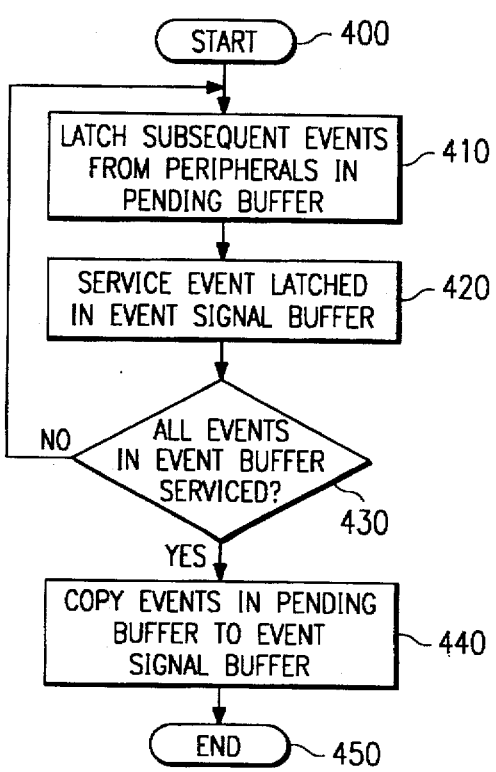
FIG. 4 is a flow diagram of a method in the present invention to store subsequent events generated by the peripheral devices after earlier events have been reported to the processor.

Referring to FIG. 4, a flow diagram is shown describing the method by which subsequent events 210 occurring in the peripheral units 140 are held as event signals in the pending buffer 220. A step 400 provides for the start of the method. At step 410, subsequent events 210 occurring in the peripheral units 140 are latched into the pending buffer 220. As stated earlier, events 210 which occur while the previous message from the mailbox message circuit 200 is being serviced by the processor 110 must be held in the pending buffer 220 and not immediately transferred to the event signal buffer 240. That is, the pending buffer 220 does not transfer subsequent event signals to the event signal buffer 240 while the control program running in the processor 110 is analyzing the current event signals in the event signal buffer. In addition, when the mailbox message circuit 200 is operating in its automatic mode, the pending buffer 220 holds event signals corresponding to events 210 which occur after the comparator 280 has qualified an event for servicing by the processor 110 and signaled the encoder 290 to build a message for delivery to the mailbox 120.

At step 420, the control program running in the processor 110 services an event 210 corresponding to a specific data element which is set in the event signal buffer 240. Once the control program completes servicing the specific event 210, it marks the event 210 serviced and searches the event signal buffer 240 for other events 210 to be serviced as indicated by data elements set within the buffer 240. At step 430, a decision is made regarding whether all events 210 corresponding to the data elements set within the event signal buffer 240 have been serviced. If events 210 within the event signal buffer 240 remain to be serviced, steps 410 and 420 are repeated. However, if all events 210 within the event signal buffer 240 have been serviced, the contents of the pending buffer 220 are copied into the event signal buffer 240 using the connecting signal lines 230. Thus, the subsequent events previously latched into the pending buffer 220 are latched into the event signal buffer 240 replacing its previous contents. These subsequent events 210 latched into the event signal buffer 240 can be compared to the allow buffer 260 to determine whether any events qualify for servicing and whether a corresponding message should be encoded and transferred to the mailbox 120 coupled to the processor 110.

A step 450 marks the end of the method for holding subsequent events 210 in the pending buffer 220. In this instance, the mailbox message system 130 resumes its normal operation. Events 210 generated within the peripheral units 140 are latched as event signals in the pending buffer 220 and immediately transferred along the signal lines 230 to the event signal buffer 240.

While the invention has been particularly shown and described with reference to preferred embodiments thereof, it will be understood by those skilled in the art that various changes in form and details may be made therein without departing from the spirit and scope of the invention.

What is claimed is:

1. In a data processing system including a processor running control instructions and coupled to a mailbox for receiving a message, peripheral circuitry generating events to be serviced, and a mailbox message circuit coupled between said processor and said peripheral circuitry, a method for reporting said events to said processor comprising the steps of:

setting a first memory in said mailbox message circuit to represent a plurality of allowable events, said plurality of allowable events being serviceable by said data processing system;

latching a plurality of event signals in a second memory of said mailbox message circuit, each event signal of said plurality of event signals originating from said peripheral circuitry and requiring service by said data processing system;

comparing said plurality of event signals with said plurality of allowable events to determine which of said plurality of event signals are currently qualified to be serviced by said data processing system;

transferring to said mailbox an encoded message indicating to said control instructions which event signal of said plurality of event signals is currently qualified to be serviced by said data processing system;

servicing said plurality of event signals latched in said second memory;

inhibiting subsequent latching of other event signals generated in said peripheral circuitry once said message has been transferred to said mailbox and until said plurality of event signals latched in said second memory have been serviced; and storing a subsequent event signal in a third memory of said mailbox message circuit, said subsequent event signal representing said event generated by said peripheral circuitry after said message was transferred to said mailbox and before said plurality of event signals in said second memory have been serviced.

2. The method in claim 1 further comprising the step of:

copying said subsequent event signal stored in said third memory to said second memory when said plurality of event signals in said second memory have been serviced.

3. The method in claim 2 wherein said setting step further comprises setting a plurality of bits in a first register, said plurality of bits in said first register set to indicate which of said plurality of allowable events are eligible for service.

4. The method in claim 3 wherein said latching step further comprises latching said plurality of event signals in a plurality of bits in a second register, said plurality of bits in said second register set to indicate which of said plurality of event signals are pending service.

5. The method in claim 4 wherein said storing step further comprises setting a bit in a third register to indicate said subsequent event signal is pending qualification as serviceable by said data processing system, said third register having a plurality of bits corresponding to said events generated by said peripheral circuitry.

6. The method in claim 1 wherein said servicing step is performed by said control instructions running in said processor.

7. In a data processing system including a processor running control instructions, a mailbox coupled to said processor for receiving a message, and peripheral circuitry generating events to be serviced by said control instructions, a mailbox message circuit coupled between said mailbox and said peripheral circuitry for reporting said events to said processor comprising:

a first memory coupled to said processor, said first memory having a plurality of data elements responsive to said control instructions running in said processor, said plurality of data elements representing allowable events eligible for service by said control instructions;

a second memory coupled to said peripheral circuitry, said second memory having a plurality of data elements for storing event signals, said event signals resulting from said events generated by said peripheral circuitry, said plurality of data elements indicating which of said events are pending service by said control instructions;

a comparator coupled to said first memory and said second memory for comparing said allowable events with said event signals to determine which of said event signals are currently qualified to be serviced by said control instructions;

an encoder coupled between said comparator and said mailbox for encoding and transmitting a message to said mailbox, said message denoting that said event signals latched in said second memory are currently qualified to be serviced by said control instructions;

a third memory coupled between said peripheral circuitry and said first memory, said third memory having a plurality of data elements for storing subsequent event signals resulting from other said events subsequently generated by said peripheral circuitry after said message was transferred from said encoder to said mailbox; and a control signal responsive to said control instructions indicating which memory contains said subsequent events signals pending qualification for service by said control instructions.

8. The mailbox message circuit in claim 7 wherein said control signal is set after said message transferred from said encoder to said mailbox to indicate that said subsequent event signals pending qualification for service are stored in said third memory, said control signal is reset after said control instructions have completed servicing said event signals to indicate that said subsequent event signals pending qualification for service are copied to said second memory.

9. The mailbox message circuit in claim 8 wherein said plurality of data elements in said first memory is a plurality of bits in a first register, said plurality of bits set to indicate which of said allowable events are eligible for service by said control instructions.

10. The mailbox message circuit in claim 9 wherein said plurality of data elements in said second memory is a plurality of bits in a second register, said plurality of bits set to indicate which of said event signals are pending service by said control instructions.

11. The mailbox message circuit in claim 10 wherein said plurality of data elements in said third memory is a plurality of bits in a third register, said plurality of bits set to indicate which of said subsequent event signals are pending service by said control instructions.

12. A data processing system comprising:

a processor running control instructions;

a mailbox coupled to said processor, said mailbox for receiving a message;

peripheral circuitry generating events to be serviced by said data processing system; and a mailbox message circuit coupled between said mailbox and said peripheral circuitry for reporting said events to said processor comprising:

a first memory coupled to said processor, said first memory having a plurality of data elements responsive to said control instructions running in said processor, said plurality of data elements representing allowable events eligible for service by said data processing system;

a second memory coupled to said peripheral circuitry, said second memory having a plurality of data elements for storing event signals, said event signals resulting from said events generated by said peripheral circuitry, said plurality of data elements indicating which of said events are pending service by said data processing system;

a comparator coupled to said first memory and said second memory for comparing said allowable events with said event signals to determine which of said event signals are currently qualified to be serviced by said data processing system;

an encoder coupled between said comparator and said mailbox for encoding and transmitting a message to said mailbox, said message denoting that said event signals latched in said second memory are currently qualified to be serviced by said data processing system; and a third memory coupled between said peripheral circuitry and said first memory, said third memory having a plurality of data elements for storing subsequent event signals resulting from other said events subsequently generated by said peripheral circuitry after said message was transferred from said encoder to said mailbox.

13. The data processing system in claim 12 wherein said event signals in said second memory representing said events generated by said peripheral circuitry are serviced by said control instructions after said mailbox receives said message.

* * * * *